United States Patent
Steinbrenner et al.

(10) Patent No.: US 7,560,494 B2
(45) Date of Patent: Jul. 14, 2009

(54) RAPID LOW-FOAM WETTING AGENTS FOR HYDROPHOBIC SURFACES

(75) Inventors: Ulrich Steinbrenner, Neustadt (DE); Paul Klingelhoefer, Mannheim (DE); Jürgen Tropsch, Römerberg (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 281 days.

(21) Appl. No.: 11/578,417

(22) PCT Filed: Apr. 26, 2005

(86) PCT No.: PCT/EP2005/004461

§ 371 (c)(1), (2), (4) Date: Oct. 13, 2006

(87) PCT Pub. No.: WO2005/105285

PCT Pub. Date: Nov. 10, 2005

(65) Prior Publication Data

US 2008/0214683 A1    Sep. 4, 2008

(30) Foreign Application Priority Data

Apr. 30, 2004    (DE) .................. 10 2004 021 434

(51) Int. Cl.
C07C 43/11 (2006.01)
C07C 41/03 (2006.01)
C11D 1/72 (2006.01)

(52) U.S. Cl. ...................... 516/204; 568/616

(58) Field of Classification Search .................. 516/204
See application file for complete search history.

(56) References Cited

U.S. PATENT DOCUMENTS 5,705,476 A * 1/1998 Hoffarth ............... 510/535

2006/0148664 A1 * 7/2006 Bergstrom .................. 510/100

FOREIGN PATENT DOCUMENTS

| DE | 292 147 | 5/1988 |
|---|---|---|
| DE | 298 651 | 12/1989 |
| EP | 0 051 878 | 5/1982 |
| EP | 0 681 865 | 11/1995 |
| EP | 0 845 449 | 6/1998 |
| WO | WO 2004/005239 | 1/2004 |

* cited by examiner

*Primary Examiner*—Ling-Siu Choi
*Assistant Examiner*—Chun-Cheng Wang
(74) *Attorney, Agent, or Firm*—Oblon, Spivak, McClelland, Maier & Neustadt, P.C.

(57) ABSTRACT

The present invention relates to the use of surfactants of the general formula (I)

$$R\text{—}O\text{-}(A)_n\text{-}(B)_m\text{-}H \qquad (I)$$

where
R is a $C_8$-alkyl radical,
A is propylenoxy,
B is ethylenoxy,
n is an average value of from 0.8 to 2.0 and
m is an average value of from 2.0 to 5.0 as a wetting agent for hydrophobic polymer surfaces, and to a wetting agent comprising
a) from 0.5 to 50% by weight of at least one surfactant of the general formula (I) according to claim 1,
b) from 1.0 to 10% by weight of a $C_8$-alcohol and
c) from 0.5 to 30% by weight of a compound of the general formula (IV)

$$R\text{—}O\text{-}(A)_n\text{-}H \qquad (IV)$$

where
R is a $C_8$-alkyl radical,
A is propylenoxy and
n is an average value of from 0.8 to 2.0.

13 Claims, No Drawings

RAPID LOW-FOAM WETTING AGENTS FOR HYDROPHOBIC SURFACES

The present invention relates to the use of surfactants based on a $C_8$ alcohol, propylene oxide and ethylene oxide as a wetting agent for hydrophobic polymer surfaces, and to a wetting agent comprising surfactants and a $C_8$ alcohol.

Surfactants based on $C_8$ alcohols, propylene oxide and ethylene oxide are already known from the prior art.

DD 292147 describes a wetting agent for dusts which are difficult to wet, for example carbon dust, composed of an alkylpolyalkylene glycol ether containing ethylene oxide and propylene oxide. For this purpose, preference is given to using a wetting agent of the formula 2-ethylhexanol-$(PO)_{2.5-3.5}$-$(EO)_{2-3}$. Carbon dust is a highly aromatic surface which cannot be applied directly to every technical application. The wetting agent is effective in the presence of concentrated salt solutions, does not foam and has short wetting times.

DD 298651 describes $C_6$-$C_9$ alcohol propoxylate ethoxylates as emulsifiers for silicones. The compounds mentioned are used to prepare storage-stable aqueous diorganopolysiloxane emulsions having storage times of 6 months.

EP 0 051 878 A1 discloses a liquid, nonfoaming, nonionic surfactant composition which has improved wetting properties and generally good degreasing and/or cleaning properties. The composition includes a compound formed from an alcohol having from 7 to 11 carbon atoms and ethylene oxide and propylene oxide units.

WO 2004/005230 describes alkoxylates of 2-ethylhexanol which contain ethylene oxide and propylene oxide as alkylene oxides. On average, from 1.6 to 3.3 units of propylene oxide are attached to from 3.0 to 5.5 units of ethylene oxide in the compounds disclosed. The alkoxylates are used as cleaning compositions for hard surfaces.

It is an object of the present invention to provide suitable surfactants for use as wetting agents for hydrophobic polymer surfaces.

This object is achieved by the use of surfactants of the general formula (I)

$$R\text{—}O\text{-}(A)_n\text{-}(B)_m\text{-}H \qquad (I)$$

where
R is a $C_8$-alkyl radical,
A is propylenoxy,
B is ethylenoxy,
n is an average value of from 0.8 to 2.0 and
m is an average value from 2.0 to 5.0 as a wetting agent for hydrophobic polymer surfaces.

The R radical is a linear or branched, saturated or unsaturated $C_8$-alkyl radical; R is preferably an alkyl radical which is at least monobranched. R is more preferably a $C_8$-alkyl radical which is monobranched.

In a very particularly preferred embodiment, surfactants are used in accordance with the invention in which R is an alkyl radical derived from 2-ethylhexanol.

In the general formula (I), A is propylenoxy. According to the invention, propylenoxy is a —O—$CH_2$—$CH(CH_3)$— or —O—$CH(CH_3)$—$CH_2$— group. In the surfactants used in accordance with the invention, ideally exclusively propylenoxy units are bonded directly to the alcohol.

In the general formula (I), B is ethylenoxy. According to the invention, ethylenoxy is the —O—$CH_2$—$CH_2$— group.

The surfactant ideally has a block structure, i.e. a propylenoxy block is bonded directly to the $C_8$ alcohol. Attached thereto is an ethylenoxy block.

As a technical surfactant, this block structure is in some cases interrupted to an extent when, for process technology reasons, the ethylene oxide metering is started even though not all of the propylene oxide has reacted with the alcohol.

In the surfactant of the general formula (I) used in accordance with the invention, n is the average value of the number of propylenoxy units bonded to the $C_8$ alcohol.

The term "average value" relates to technical products in which a different number of alkylenoxy units may be present in the individual molecules. In technical products, it describes the average proportion of the corresponding alkylenoxy units present. A value of 0.5 means, for example, that, on average, every second molecule bears a corresponding unit.

According to the invention, surfactants are used in which n has an average value of from 0.8 to 2.0, preferably from 0.8 to 1.8, more preferably from 1.3 to 1.6.

In the surfactant of the general formula (I) used in accordance with the invention, m is the average value of the number of ethylenoxy units present in the surfactant.

According to the invention, surfactants are used in which m has an average value of from 2.0 to 5.0, preferably from 2.8 to 4.0, more preferably from 2.8 to 3.2.

The surfactants of the general formula (I) combine very good properties with regard to low foaming, biodegradability and wetting rate on hydrophobic polymer surfaces, so that they can be used in accordance with the invention as wetting agents for hydrophobic polymer surfaces.

For the parent alcohol component ROH of the inventive alcohol alkoxylates, useful alcohol components are not only pure $C_8$ alcohols, but also mixtures of different isomers of a $C_8$ alcohol. An example is a mixture of different positional isomers. The alcohol component present in the surfactants of the general formula (I) used in accordance with the invention is preferably only one isomer of a $C_8$ alcohol.

The present surfactants or mixtures of surfactants used in accordance with the invention are preferably prepared by reacting alcohols of the general formula ROH or mixtures of corresponding isomeric $C_8$ alcohols, first with propylene oxide and then with ethylene oxide. The alkoxylations are preferably carried out in the presence of alkoxylation catalysts. In particular, basic catalysts such as potassium hydroxide and/or sodium hydroxide are used. Specific alkoxylation catalysts such as modified bentonites or hydrotalcites, as described, for example, in WO 95/04024, can allow the random distribution of the amounts of the incorporated alkylene oxides to be greatly narrowed, so that "narrow-range" alkoxylates are obtained.

Appropriate reaction conditions such as temperature, pressure, reaction time, solvent, workup and purification of the products, inter alia, are known to those skilled in the art. Likewise known to those skilled in the art are suitable reactors for the preparation of the surfactants usable in accordance with the invention.

In a preferred embodiment of the present invention, surfactants are used as wetting agents of hydrophobic polymer surfaces, and the surfactants have a wetting performance $WP_{PE}$ according to the general formula (II)

$$WP_{PE} = \frac{\cos\varphi_{surfactant\ solution, 10\ s} - \cos\varphi_{dist.\ water}}{1 - \cos\varphi_{dist.\ water}} \qquad (II)$$

where
$\varphi_{surfactant\ solution,\ 10s}$ contact angle of a drop of a 0.02% by weight aqueous surfactant solution at 40° C. on a polyethylene surface 10 s after the drop hits it and ☐$_{dist.\ water}$ contact angle of a drop of dist. water at 40° C. on a polyethylene surface 10 s after the drop hits it of >0.41.

The wetting agents used in accordance with the invention more preferably have wetting performances $WP_{PE}$ of >0.48, even more preferably >0.52, especially preferably >0.58.

Definition of the Wetting Performance $WP_{PE}$ for Hydrophobic Polymer Surfaces:

The wetting performance for hydrophobic polymer surfaces is determined via the contact angle of a drop of a 0.02% by weight aqueous surfactant solution determined at 40° C. on a polyethylene surface 10 seconds after the drop hits it. The reference used is an analogous experiment with distilled water.

In a further preferred embodiment of the present invention, surfactants are used as wetting agents of hydrophobic polymer surfaces, and the surfactants have a wetting rate $WR_{PE}$ according to the general formula (III)

$$WR_{PE} = \frac{\cos\varphi_{surfactant\ solution, 50\ ms} - \cos\varphi_{dist.\ water}}{1 - \cos\varphi_{dist.\ water}} \cdot \frac{1}{WP_{PE}}, \quad (III)$$

of >0.85 wherein ☐$_{dist.\ water}$ and $WP_{PE}$ are as defined above and ☐$_{surfactant\ solution,\ 50\ ms}$ is the contact angle of a drop of a 0.02% by weight aqueous surfactant solution at 40° C. on a polyethylene surface 50 milliseconds after the drop hits it.

The wetting agents used in accordance with the invention more preferably have wetting rates $WR_{PE}$ of >0.87, even more preferably >0.90, especially preferably >0.92.

Definition of the Wetting Rate $WR_{PE}$ for Hydrophobic Polymer Surfaces:

The wetting rate for hydrophobic polymer surfaces of a surfactant is determined via the progression with time of the contact angle of a drop of an aqueous surfactant solution on a polyethylene surface. It is calculated from the contact angles 50 milliseconds after the drop hits the surface and the wetting performance $WP_{PE}$ for the same surface. The reference used is again an analogous experiment with distilled water.

In general, the hydrophobic or hydrophobicized polymer surfaces suitable in accordance with the invention may consist of any natural or synthetic material, or of mixtures of different materials.

Hydrophobic polymer surfaces refer, for example, to all hydrophobic or hydrophobicized biopolymers or plastics.

Preference is given to using the surfactants of the general formula (I) as wetting agents for hydrophobic polymer surfaces which are composed of hydrophobic polymers selected from the group consisting of cotton, polyTHF-based polymers such as Lycra® or PEEK, polyethylene, polypropylene, polyamides, polyethers, polycarbonates, polyurethanes, rubber, silicone, polybutadiene, polystyrene and ABS. It is also possible to use the surfactants of the general formula (I) as wetting agents for surfaces of plants, for example leaves, needles, or animals, for example chitin shells of insects. It is also possible to use mixtures of these materials. Particular preference is given to polyester, polyamide, polypropylene, cotton and mixtures thereof.

Preference is given to using the surfactants of the general formula (I) as wetting agents for hydrophobic polymer surfaces, these being selected from the group consisting of moldings, fibers, dusts, granules, powders, foams, fabrics, yarns. Powders and dusts are less preferred.

Particular preference is given to selecting the hydrophobic polymer surfaces from the group consisting of fibers, yarns and fabrics.

The inventive low-foam or foam-suppressing surfactants may be used in a multitude of applications. Preference is given to using them as nonionic surfactants preferably in detergent formulations and in surfactant-containing formulations for chemical-industrial applications, for example for cleaning processes in industry and household, such as for textile washing, or for cleaning processes in the foods sector such as the cleaning of drinks bottles or of vessels or of plants in the food processing industry or in dishwasher detergents.

In particular, it is the cleaning of hard surfaces made, for example, of glass, ceramic, lacquer, plastic or metal that is of interest. The surfactants further find use in industrial cleaners and in cleaning processes in the metals processing industry.

The surfactants may also be used advantageously for a multitude of other chemical-industrial processes, for instance generally in the metals processing industry, for example in cooling lubricants, hardening oils, hydraulic oil emulsions, polishing pastes, mold release agents, drawing oils, mordants, metal cleaners or metal driers.

In this context, the surfactants may be used in the production and processing of textiles. The application of surfactants in the production and processing of textiles is extremely versatile; it extends mainly to the fields of: pretreatment compositions of fibers, production of rayon fibers, spin finishes and textile melts, dyeing assistants, finishes, hydrophobicizing agents, assistants for printing, antistats or flocculants and coating compositions.

In addition, it is also possible to use surfactants in the leather, paper, printing, electroplating and photographic industry. Important fields of use here are coatings, pigments and printing inks. Surfactants are used in these fields of application both in aqueous and in nonaqueous systems. In nonaqueous systems, they serve in particular as dispersing assistants, antisettling agents or flow control agents. In addition, surfactants enable the preparation of what are known as highsolids systems. Surfactants have a larger share in aqueous systems in which they serve not only to stabilize the binders which are prepared by emulsion polymerization or polycondensation and are based on polymer dispersions but also serve as dispersing assistants of organic and inorganic pigments which are often used. In addition, they improve the adhesion properties of these coating compositions.

In addition, the surfactants may be used in water treatment, for example in wastewater treatment.

In addition, the surfactants may be used in crop protection formulations.

In addition, the compounds may be used as surfactants or emulsifiers in the polymer production and polymer processing industry. Main fields of application in polymer production and processing are: production of polymer dispersions, production of bead polymers, production of foams, use of interface-active mold release agents, production of microcapsules, improvement of the adhesion between fillers and polymers, additives to polymer dispersions for the achievement of particular effects such as foamability, filler compatibility or wetting capability, emulsifiers for nonaqueous systems, coloring of plastics, antistatic modification of polymers or adhesives.

The present invention also relates to a wetting agent comprising a) from 0.5 to 50% by weight of at least one surfactant of the general formula (I), b) from 1.0 to 10% by weight of a $C_8$ alcohol and c) from 0.5 to 30% by weight of a compound of the general formula (IV)

R—O-(A)$_n$-H (IV)

where
R is a C$_8$-alkyl radical,
A is propylenoxy and
n is an average value of from 0.8 to 2.0.

The inventive wetting agent contains, as component a), from 0.5 to 50% by weight, preferably from 5 to 30% by weight, more preferably from 8 to 25% by weight, of a surfactant of the general formula (I). Structure and preferred ingredients of this surfactant have already been illustrated above.

As component b), the inventive wetting agent contains from 1.0 to 10% by weight, preferably from 1.5 to 5.0% by weight, more preferably from 1.5 to 4.0% by weight, of a C$_8$ alcohol. For the C$_8$ alcohol, that which has already been stated with regard to the surfactant of the general formula (I) applies. Component b) has a synergistic action as a cosurfactant and wetting agent in the inventive wetting agent.

As component c), the inventive wetting agent contains from 0.5 to 30% by weight, preferably from 2.0 to 20% by weight, more preferably from 5 to 15% by weight, of a compound of the general formula (IV)

R—O-(A)$_n$-H (IV)

where
R is a C$_8$-alkyl radical,
A is propylene oxide and
n is an average value of from 0.8 to 2.0.

The R radical is a linear or branched, saturated or unsaturated C$_8$-alkyl radical; R is preferably an alkyl radical which is at least monobranched. R is more preferably a C$_8$-alkyl radical which is monobranched. In a very particularly preferred embodiment, the inventive wetting agents comprise, as component c), compounds in which R is the alkyl radical derived from 2-ethylhexanol.

In a preferred embodiment, R in components a) or c) of the inventive wetting agent is the alkyl radical derived from 2-ethylhexanol.

In a particularly preferred embodiment, components a), b) and c) derive from the identical C$_8$ alcohol. This C$_8$ alcohol is most preferably 2-ethylhexanol.

The compound of the general formula (IV) is a nonethoxylated, i.e. exclusively propoxylated, surfactant which acts as an efficient defoamer in the inventive wetting agent. The defoaming action is desired in the inventive wetting agent.

In the general formula (IV), A is propylenoxy. According to the invention, propylenoxy is the —O—CH$_2$—CH(CH$_3$)— or —O—CH(CH$_3$)—CH$_2$— group.

In the inventive wetting agents, component c) used is a compound of the general formula (IV) in which n has an average value of from 0.8 to 2.0, preferably from 0.8 to 1.8, more preferably from 1.3 to 1.6. With regard to the definition of average value, that which was stated above applies.

The aforementioned surfactants of the general formula (IV) used in accordance with the invention are preferably prepared by reacting alcohols of the general formula ROH or mixtures of corresponding isomeric C$_8$ alcohols with propylene oxide. The alkoxylations are preferably carried out in the presence of alkoxylation catalysts. The catalysts used are in particular basic catalysts such as potassium hydroxide and/or sodium hydroxide. Specific alkoxylation catalysts such as modified bentonites or hydrotalcites, as described, for example, in WO 95/04024, allow the random distribution of the amounts of incorporated alkylene oxides to be greatly narrowed, so that "narrow-range" alkoxylates are obtained.

Appropriate reaction conditions such as temperature, pressure, reaction time, solvent, workup and purification of the products, inter alia, are known to those skilled in the art. Likewise known to those skilled in the art are suitable reactors for the preparation of the surfactants usable in accordance with the invention.

The inventive wetting agent may be prepared by mixing components a), b) and c) in any sequence, preferably in the presence of a suitable solvent. Suitable solvents are polar solvents, for example alcohols, ketones, water or salt solutions such as aqueous sodium hydroxide solution. It is also possible to use a mixture of solvents.

In a preferred embodiment, components a), b) and c) of the inventive wetting agent are present in aqueous solution, i.e. water is used as the solvent for the inventive wetting agent.

The inventive wetting agent is low-foaming. According to the mechanical foaming method EN 12728 (40° C., 2 g/l of surfactant, 10° German hardness), the results obtained for the inventive wetting agent are <20 ml, preferably <30 ml, more preferably <20 ml, most preferably <15 ml of foam.

What is claimed is:

1. A wetting agent comprising:
   a) from 0.5 to 50% by weight of at least one surfactant of formula (I)

R—O-(A)$_n$-(B)$_m$-H (I)

where
R is a C$_8$-alkyl radical,
A is propylenoxy,
B is ethylenoxy,
n is an average value of from 1.3 to 1.6, and
m is an average value of from 2.8 to 3.2, b) from 1.5 to 5.0% by weight of a C$_8$ alcohol, and
   c) from 0.5 to 30% by weight of a compound of formula (IV)

R—O-(A)$_n$-H (IV)

where
R is a C$_8$-alkyl radical,
A is propylenoxy, and
n is an average value of from 1.3 to 1.6; and the remaining % by weight being solvent.

2. The wetting agent according to claim 1, wherein R in components a) and c) is the alkyl radical derived from 2-ethylhexanol.

3. The wetting agent according to claim 1, wherein components a), b) and c) derive from the identical C$_8$ alcohol.

4. The wetting agent according to claim 1, wherein components a), b) and c) are present in amounts of:
   a) from 5.0 to 30% by weight,
   b) from 1.5 to 5% by weight, and
   c) from 2.0 to 20% by weight.

5. The wetting agent according to claim 1, wherein the C$_8$ alcohol is 2-ethylhexanol.

6. The wetting agent according to claim 1, wherein components a), b) and c) are present in aqueous solution.

7. The wetting agent according to claim 1, wherein said wetting agent has a wetting performance WP$_{PE}$ according to formula (II)

$$WP_{PE} = \frac{\cos\varphi_{surfactant\ solution,10\ s} - \cos\varphi_{dist.\ water}}{1 - \cos\varphi_{dist.\ water}}, \quad (II)$$

of greater than 0.41, wherein $\varphi_{surfactant\ solution,\ 10s}$ is the contact angle of a drop of a 0.02% by weight aqueous surfactant solution at 40° C. on a polyethylene surface 10 seconds after the drop hits it, and $\varphi_{dist.\ water}$ is the contact angle of a drop of distilled water at 40° C. on a polyethylene surface 10 seconds after the drop hits it.

8. The wetting agent according to claim 7, wherein said wetting agent has a wetting performance $WP_{PE}$ of greater than 0.58.

9. The wetting agent according to claim 7, wherein said wetting agent further has a wetting rate $WR_{PE}$ according to formula (III)

$$WR_{PE} = \frac{\cos\varphi_{surfactant\ solution, 50\ ms} - \cos\varphi_{dist.\ water}}{1 - \cos\varphi_{dist.\ water}} \cdot \frac{1}{WP_{PE}}, \quad \text{(III)}$$

of greater than 0.85, wherein $\varphi_{surfactant\ solution,\ 50\ ms}$ is the contact angle of a drop of a 0.02% by weight aqueous surfactant solution at 40° C. on a polyethylene surface 50 milliseconds after the drop hits it.

10. The wetting agent according to claim 9, wherein said wetting agent has a wetting rate $WR_{PE}$ of greater than 0.92.

11. The wetting agent according to claim 1, wherein components a), b) and c) are present in amounts of:
   a) from 8 to 25% by weight,
   b) from 1.5 to 4% by weight, and
   c) from 5 to 15% by weight.

12. The wetting agent according to claim 1, wherein said wetting agent produces less than 30 ml of foam according to foaming method EN 12728 (40° C., 2 g/l of surfactant, 10° German hardness).

13. The wetting agent according to claim 1, wherein said wetting agent produces less than 15 ml of foam according to foaming method EN 12728 (40° C., 2 g/l of surfactant, 10° German hardness).

* * * * *